United States Patent

[15] 3,641,514

Rees

[45] Feb. 8, 1972

[54] MEMORY SYSTEM

[72] Inventor: Vernon C. Rees, Newark, Ohio

[73] Assignee: Owens-Corning Fiberglas Corporation

[22] Filed: July 20, 1970

[21] Appl. No.: 64,015

[52] U.S. Cl. ..................... 340/173 R, 340/173 CA, 307/251
[51] Int. Cl. .......................................................... G11c 11/40
[58] Field of Search .................. 340/173; 307/278, 246, 251

[56] References Cited

UNITED STATES PATENTS 3,373,295  3/1968  Lambert ........................ 340/173 FF
3,449,564  6/1969  Harvey ................................. 330/291

Primary Examiner—Terrell W. Fears

[57] ABSTRACT

A memory unit comprising an electronic valve component having a very high-input impedance and including a control electrode and two output load electrodes. An input signal storage means is connected to the control electrode. An output means is connected between one of the output or load electrodes and a voltage supply. A zero adjustment impedance means is connected between that one of the output electrodes and the voltage supply to adjust current flow through the output means when no input signal is present. A span adjustment impedance means is connected between the other of the two output electrodes to regulate gain of the electronic valve independently of the zero adjustment impedance means. The electronic valve component is preferably a field effect transistor.

8 Claims, 1 Drawing Figure

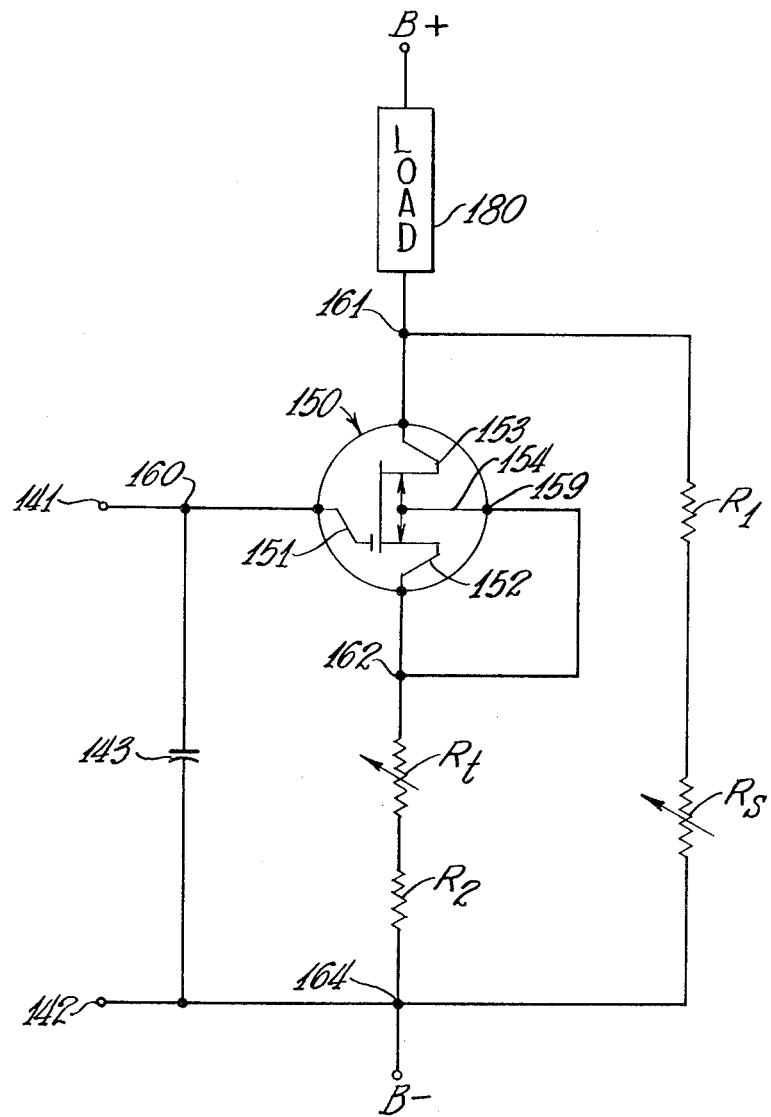

MEMORY SYSTEM

With a continual expansion of automated controls for system operation, emphasis is constantly being placed on low-cost components and the reliability of the components. This has resulted in refinement of saturable reactors, more reliable vacuum tube components, and other known components and in the development of new control components such as the semiconductor family. The reactor, heavy duty vacuum tube, and the semiconductor component reliability is enhanced since there are no moving parts. This development to the present has concentrated on a component capable of providing a quick, complete response to an input signal. In turn, there is usually connected therewith a relatively fast, substantially one-shot output. There has been a need for a control component which is able to provide a prolonged output signal, which output signal is variable in response to intermittent input signals. Reliability has been attained in the present invention by the development of a device or unit having no moving parts, but which is capable of providing a sustained and prolonged output with little degree of change even though an input signal is not received for a substantial period of time.

Such a component or unit is suitable for use, for example, with process values controlled by computers and, in certain instances, permits the time sharing of a single digital to analog converter with a number of process valves rather than requiring a separate converter for each valve. In a system of this type the computer normally receives process input signals from sensors associated with variables of the process, and from these input signals calculates the adjustments necessary for the process valves to bring the variables to predetermined desired levels.

When the computer is a digital computer each digital computation must be translated to an analog signal for adjustment of its respective valve in the process. The computer makes a quick calculation for each variable and in a fraction of a second supplies the signal for adjustment of one or more valves associated with the variable. The computer then transfers to the next variable and similarly computes and supplied an adjustment or control signal. Heretofore, in prior art systems only the computer was time shared among a number of digital to analog converters, each associated with its own process valve to be controlled. With the device of this invention the multiplicity of digital to analog converters, each for a separate valve, may be replaced with a single digital to analog time shared converter and a memory unit as disclosed hereinafter for each valve or condition to be controlled. Since the memory unit costs substantially less than an analog converter, it may be seen that a considerable savings can be obtained without sacrificing reliability and, in fact, adding desirable features.

A memory unit of this type is disclosed in my copending U.S. application, issued on Sept. 16, 1969 as U.S. Pat. No. 3,467,947. The memory unit disclosed in my copending application includes means for adjusting the output of the memory unit so that the output of a plurality of memory units could be trimmed to be substantially the same. Further, the disclosed memory unit included means for establishing a bias voltage for the amplifying portion of the memory unit to provide a "zero" or starting level for the output signal. However, the circuit arrangements disclosed for establishing the "zero" or starting level for the output signal and for adjusting the output of the memory units are dependent upon each other. As the memory units have been applied in practice it has been found to be necessary in certain applications to be able to elevate the "zero" starting level of the unit to a predetermined level and to trim the output or the gain of the unit independently. For example, some process control units need to be controlled in very fine increments. While the unit disclosed in my previous application is satisfactory for some applications, there are other applications in which the control increment needs to be much smaller since the control required is finer.

Accordingly, it is an object of this invention to provide improved control apparatus.

It is a further object of this invention to provide improved control apparatus in which a memory unit includes the ability to establish starting levels and to trim the gain or output of the unit independently.

It is a still further object of this invention to provide an improved memory unit in which the output or starting level of the device can be elevated to the range of the process control means connected thereto and in which the output of the device can be regulated within the elevated starting range thus established.

Another object of this invention is to provide an improved memory unit having means for establishing an elevated "zero" level and a suppressed span adjustment providing the same incremental control within a limited range, thus increasing the resolution of the device.

In carrying out the above objects the control apparatus of this invention features a memory unit for receiving input signals of very short duration and providing an output signal over long periods of time, proportional in magnitude to the last received input signal, which comprises an electronic valve means having a very high input impedance, the valve including control electrode means, a plate electrode means and cathode electrode means. Storage means for the input signals is connected to supply the control electrode means. Means are provided for connecting output means and voltage supply means in circuit with the plate electrode means. Zero adjustment impedance means is connected between the plate electrode means and the voltage supply means to permit current to flow through both the output means and the zero adjustment means, the value of the zero adjustment impedance means determining the initial operating level for the output means. A span impedance means is connected between the cathode electrode means and the voltage supply means to permit regulation of the gain of the electronic valve means independently of the zero adjustment impedance means. The electronic valve means is advantageously a field effect transistor means.

Other objects, advantages and features of the present invention will become readily apparent when the following description is taken in conjunction with the accompanying drawing, in which there is illustrated a preferred embodiment of the present invention.

Referring to the single drawing there is illustrated in circuit diagram a memory unit component embodying the teachings of this invention. The memory unit is adapted to receive input signals of very short duration and provide output signals, proportional in magnitude to the last received input signal, over long periods of time. The unit comprises an electronic valve means generally indicated at 150 having a very high input resistance and including a control or gate electrode means 151, a plate or drain electrode means 153, a cathode or source electrode means 152, and a second control or substrate and case electrode means 154. Terminal means 161, 162 and 164 provide means for connecting an output means of load 180 and source voltage means such as B+ and B− voltage sources in circuit with the plate or drain electrode means 153 and the cathode or source electrode means 152. A capacitive storage means 143 is connected to the control or gate electrode means 151 via terminal means 160. Terminal means 141 and 142 provide means for applying an input signal to the storage means 143 and thus to the control electrode means 151. The capacitive means 143 is operative to receive and store input signals applied to terminals 141, 142 and thus to the control electrode means 151 thereby controlling the output of the memory means to the output means or load 180.

The electronic valve means utilized in this invention may be any electronic valve means having a sufficiently high input resistance or impedance and capable of providing the same operation as required in the example set forth. Advantageously an electronic valve means of the silicon insulated-gate, field-effect transistor means such as the 3N139 commercially available from the Radio Corporation of America may be used in this application. These transistors have the gate offset toward the source to provide substantially reduced feedback capacitance, and a very high-input resistance (in the order of $10^{15}$ ohms). The devices are relatively insensitive to temperature. The combination of load to bias capacitance and very high input impedance makes this particular electronic valve means especially useful in this application. As will be noted the second control or substrate and case electrode means 154 is connected to the terminal 162 to insure that this electrode means operates at substantially the same potential as the cathode or source electrode means 152. Further, via a connection to 159 the second control or substrate electrode means is connected to the case of electronic valve means 150. In operation, current flow between first load electrode 153 and second load electrode 152 is controlled by the signal present at third or control electrode 151.

The output means or load 180 is connected in series between one side of the voltage supply source and the electrode 153. A "zero" adjustment impedance means, shown as an adjustable resistance $R_s$, is connected between the electrode 153 and the other side of the voltage supply source. The connection illustrated in the drawing permits current to flow through both the output means 180 and the "zero" adjustment impedance means $R_s$, the value of the "zero" adjustment impedance means determining the initial operating level and current flow through the output means 180. This is established before an input signal is applied to or received by the capacitor 143. Thus the "zero" adjustment impedance $R_s$ and a current limiting resistor $R_1$ are in series alone with the load 180, when an input signal is not present at the control electrode means 151.

A "span" impedance means, noted in the drawing as an adjustable resistor $R_t$, is connected in series with a current limiting resistor $R_2$ between the second load electrode 152 and the voltage supply means to permit regulation of the gain of the electronic valve means independently of the "zero" adjustment impedance means $R_s$.

Thus, in this arrangement the output means 180 has current from both the "zero" adjustment and "span" adjustment branches passing therethrough, while prior art arrangements have current passing through the output means from the "span" adjustment branch only. The output means in the circuit herein is affected independently by both the span branch and the zero branch signals. The span of this circuit can be suppressed to amplify the reading and narrow range of operating of the circuit and the zero reading can be elevated to a desired operating level.

Assume that the memory unit is being utilized with a computer in which the computer output has 1,000 increments of control available over the range to be controlled. In the prior art it was possible only to control every one one-thousandth of the total range of the memory unit. By utilizing the circuit disclosed herein, the elevated zero and suppressed span arrangement can provide the same 1,000 control increments within a limited range, for example within 10 percent of the original 0 to 100 percent range, thus increasing the resolution of the unit by a factor of 10.

Therefore, the memory unit described herein is able to control a component in a process by making very small adjustments to provide the fine control desired. This avoids "bumping" the process or making adjustments too large so that a continuous hunting for the proper control level occurs.

There has thus been disclosed and described herein a memory unit for receiving input signals of relatively short duration and providing an output signal, proportional in magnitude to the last received input signal, over a long period of time which comprises an electronic valve means having a very high-input impedance and including first an second electrodes and a third electrode for controlling current flow between the first and second electrodes. Storage means are provided connected to receive the input signals and apply them to the third electrode means. An output means is connected in series between one of the first an second electrodes and one side of a voltage supply. A zero adjustment impedance means is connected between the said one of the first and second electrodes and the other side of the voltage supply means to permit current to flow through both the output means and the zero adjustment impedance means, the value of the zero adjustment impedance means, the value of the zero adjustment impedance means determining current flow through the output means when no input signal is present is the storage means. A span impedance means is connected between the other of the first and second electrodes and the voltage supply means for regulating the gain of the electronic valve means independently of the zero adjustment means.

The memory unit illustrated in this invention is adapted to receive and record a substantially instantaneous signal, corresponding in magnitude to a computed value for its valve or other condition being controlled, and hold the recorded value for use by the valve after the computer has been switched to a subsequent branch or loop for which the system is to act similarly. The high-input impedance of the electronic valve means allows a signal charged into a good quality condenser to be recorded and fed from the condenser to the valve or other condition being controlled for adjustment without draining the condenser of the signal supplied to it. In tests the memory unit has permitted signals to be recorded and fed to a valve or other control medium, while at the same time holding the recorded values for 24 hours within 1 percent of their original value. Thus, a novel memory unit for receiving input signals of very short duration and providing output signals proportional in magnitude to the last received input signal, over long periods of time has been described and disclosed herein.

In conclusion it is pointed out that while the illustrated example constitutes a practical embodiment of my invention, I do not limit myself to the exact details shown, since modifications may be made without departing from the spirit and scope of this invention.

I claim:

1. A memory unit for receiving input signals of very short duration and providing over long periods of time an output signal which is proportional to the last received input signal, comprising an electronic valve means having a very high-input impedance and including a control electrode means, a plate electrode means, and a cathode electrode means; storage means for said input signals connected to supply said control electrode means; means for connecting output means and voltage supply means in circuit with said plate electrode means; zero adjustment impedance means connected between said plate electrode means and said voltage supply means to permit current to flow through both said output means and said zero adjustment impedance means, the value of said zero adjustment impedance means determining the initial operating level for said output means; and span impedance means connected between said cathode electrode means and said voltage supply means to permit regulation of the gain of said electronic valve means independently of said zero adjustment impedance means.

2. A memory unit for receiving input signals of short duration and providing an output signal which is proportional to the last received input signal comprising an insulated-gate field-effect transistor means having a gate electrode means, drain electrode means and source electrode means; capacitive storage means for receiving input signals connected to said gate electrode means; means for connecting output means between said drain electrode means and a voltage supply means; zero adjustment impedance means connected between said drain electrode means and said voltage supply means to permit current to flow through both said output means and said zero adjustment impedance means, the value of said zero adjustment impedance means determining the initial operating level for said output means; and span impedance means connected between said source electrode means and said voltage supply means for regulating the gain of said field-effect transistor means independently of said zero adjustment impedance means.

3. A memory unit for receiving input signals of relatively short duration and providing an output signal over a long period of time which is proportional to the last received input signal comprising an electronic valve means having a very high-input impedance and including first and second electrodes and a third electrode for controlling current flow between said first and second electrodes; storage means connected to receive said input signals and apply them to said third electrode means; means for connecting output means between one of said first and second electrodes and one side of a voltage supply means; zero adjustment impedance means connected between said one of said first and second electrodes and the other side of the voltage supply means to permit current to flow through both said output means and said zero adjustment impedance means, the valve of said zero adjustment impedance means determining current flow through said output means when no input signal is present in said storage means; and span impedance means connected between the other of said first and second electrodes and said voltage supply means for regulating current flow between said first and second electrodes independently of said zero adjustment impedance means.

4. A memory unit for receiving input signals of relatively short duration and providing an output signal over a long period of time, which is proportional to the last received input signal, comprising an electronic valve means having a very high-input impedance and including first and second electrodes and a third electrode for controlling current flow between said first and second electrodes; storage means connected to receive said input signals and apply them to said third electrode means; means for connecting output means between one side of a voltage supply means and one of said first and second electrodes; zero adjustment impedance means connected between said one of said first and second electrodes and the other side of said voltage supply means to permit current to flow through both said output means and said zero adjustment impedance means, the value of said zero adjustment impedance means determining current flow through said output means when no input signal current flow through said output means when no input signal is present in said storage means; and span impedance means connected in circuit with said first and second electrode means and said output means for regulating current flow through said output means independently of said zero adjustment impedance means.

5. A memory unit as defined in claim 4 in which said electronic valve comprises an insulated-gate field-effect transistor, and in which said first and second electrodes are drain and source electrodes and said third electrode is a gate electrode.

6. A memory unit for receiving input signals of very short duration and providing over long periods of time an output signal which is proportional to the last received input signal, comprising an electronic valve means having a very high-input impedance and including a control electrode means, a plate electrode means, and a cathode electrode means; storage means for said input signals connected to supply said control electrode means; means for connecting output means and voltage supply means in circuit with said plate electrode means; and zero adjustment impedance means connected between said plate electrode means and said voltage supply means to permit current to flow continuously through both said output means and said zero adjustment impedance means even though an input signal is not present at said control electrode means, the value of said zero adjustment impedance means determining the initial operating level for said output means.

7. A memory unit for receiving input signals of short duration and providing an output signal, which is proportional to the last received input signal, comprising an insulated-gate field-effect transistor means having a gate electrode means, drain electrode means and source electrode means; capacitive storage means for receiving input signals connected to said gate electrode means; means for connecting output means between one of said drain and source electrode means and a voltage supply means; and zero adjustment impedance means connected between said electrode means connected in circuit with said output means and said voltage supply means to permit current to flow continuously through both said output means and said zero adjustment impedance means at all times, the value of said zero adjustment impedance means determining the initial operating level for said output means.

8. A memory unit for receiving input signals of relatively short duration and providing over long periods of time an output signal which is proportional to the last received input signal, comprising an electronic valve means having a very high input impedance and including first and second electrodes and a third electrode for controlling current flow between said first and second electrodes; storage means connected to receive said input signals and apply them to said third electrode means; means for connecting output means between one of said first and second electrodes and one side of a voltage supply means; and zero adjustment impedance means connected between said one of said first and second electrodes and the other side of said voltage supply means to permit current to flow through both said output means and said zero adjustment impedance means at all times when connected in said circuit with said voltage supply means, the value of said zero adjustment impedance means determining current flow through said output means when no input signal is present in said storage means.

* * * * *